United States Patent [19]

Westerdale

[11] Patent Number: 4,992,013

[45] Date of Patent: Feb. 12, 1991

[54] COMBINATION FREIGHT AND VEHICLE CARRYING TRAILER

[75] Inventor: Norman Westerdale, Novi, Mich.

[73] Assignee: Autohaul Industries, Inc., Flint, Mich.

[21] Appl. No.: 260,788

[22] Filed: Oct. 21, 1988

[51] Int. Cl.$^5$ .............................................. B60P 3/08
[52] U.S. Cl. .................................... 410/29.1; 410/26; 105/371
[58] Field of Search ...................... 410/24, 26, 27, 29, 410/29.1, 54, 3, 8, 4, 11, 13, 14; 105/375, 370, 371, 372; 254/228, 201, 93 R, 133 R, 93 A, 93 VA; 108/7, 20, 106, 39, 147

[56] References Cited

U.S. PATENT DOCUMENTS

| 1,083,831 | 1/1914 | Holdaway et al. | 105/370 |
| 1,229,374 | 6/1917 | Youngblood | 410/27 |
| 1,514,211 | 11/1924 | Hester | 105/370 |
| 2,929,339 | 3/1960 | Schueder et al. | 410/27 |
| 2,959,262 | 11/1960 | Parker et al. | 410/27 |
| 3,043,454 | 7/1962 | Butler et al. | 410/26 |
| 3,367,287 | 2/1968 | Dunlop | 105/371 |
| 3,516,706 | 6/1970 | Bruce | 105/370 |
| 4,343,401 | 8/1982 | Paulyson | 410/26 |
| 4,701,086 | 10/1987 | Thorndyke | 410/26 |
| 4,822,222 | 4/1989 | Zeuner et al. | 410/29.1 |

FOREIGN PATENT DOCUMENTS 21732 12/1956 Fed. Rep. of Germany ........ 410/26
515590 2/1955 Italy ..................... 410/27

Primary Examiner—Robert P. Olszewski
Assistant Examiner—Mark T. Le
Attorney, Agent, or Firm—Krass & Young

[57] ABSTRACT

The invention is a new method and apparatus for alternatively utilizing an enclosed trailer for vehicular and non-vehicular cargo. A pair of tracks located on opposite sides of the center line of the vehicle are independently mounted on a series of full range hydraulic actuators, and lowered and raised to effect the loading of a series of vehicles on the tracks and then raising that series of vehicles to a height above the floor of the trailer to allow the loading of a second layer of vehicles on the floor of the trailer. The tracks can be articulated to a position defined by the full range of travel of the hydraulic actuators, thereby stowing the tracks in a position immediately adjacent to the floor or ceiling of the enclosure, freeing the largest possible portion of the interior for conventional cargo. In an alternative configuration, a movable platform roughly of the dimensions of the trailer floor is used in place of the tracks to provide elevated storage areas for vehicular and non-vehicular cargo. In addition, in either configuration, a segmented track or platform can be utilized to allow for differing dimensions of cargo, whereby the tracks or platform are divided into independently actuated sections.

16 Claims, 3 Drawing Sheets

COMBINATION FREIGHT AND VEHICLE CARRYING TRAILER

FIELD OF THE INVENTION

The invention pertains generally to enclosed trailers for carrying, in the alternative, freight or wheeled vehicles; and particularly, to such trailers equipped with improved hydraulic means for repositioning load carrying supports for motor vehicles within the confines of the trailer.

BACKGROUND OF THE INVENTION

Enclosed trailers for the hauling of freight and motor vehicles are not new to the art. Typically, freight or wheeled vehicles may be carried in the same enclosed trailer, allowing a single wheeled, trailered vehicle to be a versatile addition to the motor fleets of those engaged in moving various types of products over the highway. Conventional enclosed trailers have been used for decades, long before the advent of motorized tractors, for the movement of freight in an enclosure which is to some degree protected from the environment. The enclosure is often nothing more than a six-sided container, rectangular in cross section, mounted on a wheeled chassis. The enclosure sides, floor and top may be of a variety of materials, including wood, metal, flexible materials or fabric curtains. The chief purpose of this type of enclosure is to insure that the cargo is protected from the elemental forces of nature, as well as the hazards of highway travel, such as road dust and grime, gravel and the like.

To maximize the utility of such vehicles, the trailer enclosures tend to be constructed to the maximum height, width and length permitted by the laws of the units of government maintaining the highways over which the vehicles will travel. Such trailers are well suited to carrying freight which is containerized, stackable and palletable. Likewise, such vehicles are suitable for the carrying of completely assembled wheeled vehicles such as automobiles, pick-up trucks and the like. To utilize the cargo space in the interior of such trailers to the fullest, however, methods have been devised to fully utilize the vertical height of the trailers, typically by "stacking" vehicular cargo in multiple layers within the confines of the enclosure.

Previously, it has been taught to install within the trailer enclosure a pair of vehicle tracks. These vehicle tracks are horizontally disposed planar surfaces of a width equal to or greater than that of the conventional automobile or truck tires, and of a length which extends from the forward end of the enclosure to the rearward end of the enclosure. The rearward end of the enclosure is usually equipped with a door to allow access to the internal cargo. The tracks may be articulated at one or more points along their length. Previously, it has been known to vertically support said tracks by a series of hydraulic cylinders with two or more such cylinders disposed on each track, one or more near the forward portion of the track, one or more near the center of the track, and one or more near the rear end of the track. By selectively pressurizing and depressurizing the hydraulic cylinders, the position of the tracks may be raised or lowered within the confines of the enclosure, and the tracks may be tilted to bring the rear edge of the track in somewhat closer proximity to the floor of the trailer to facilitate loading and unloading of the vehicles on the tracks. When the trailer is to be used for hauling non-vehicular cargo, the tracks may be lowered to the limit of travel of the hydraulic cylinders, or alternatively may be raised to the maximum extent of travel of the hydraulic cylinders, thereby moving the vehicle loading tracks to a position less likely to obstruct other cargo when the trailer is used for non-vehicular contents.

In the past, such systems have exhibit numerous shortcomings. Because both single action and multiple action hydraulic cylinders have a fixed physical length when fully retracted, the vehicle tracks cannot be conveniently retracted to a position in close proximity to either the floor or roof of the van. To insure a useful operating range to conventional hydraulic cylinders, such hydraulic cylinders must be of sufficient size to position the vehicles loaded on the tracks to a sufficient height above the floor of such enclosed trailers to allow a second layer of vehicular cargo to be driven into and carried on the floor of the trailer. At the same time, the tracks must be movable to a position somewhat near the floor. Such cylinders typically have a minimum collapsed length which effectively establishes the minimum distance between the tracks and the floor or ceiling of the enclosure. Often these dimensions are unacceptable, and severely restrict the usable cargo space when the vehicle is not used for vehicle hauling.

In addition, single action and multi-action hydraulic cylinders are prone to bleed and fully or partially collapse while under pressure. This necessitates the use of mechanical locking devices in addition to the hydraulic cylinders.

The present invention is designed to overcome these shortcomings, and to insure that the vehicle storage tracks may be retracted to a position in very close proximity to the upper and lower surfaces of the enclosure, thereby maximizing the available cargo space.

DESCRIPTION OF THE PREFERRED EMBODIMENT

Figure 1:
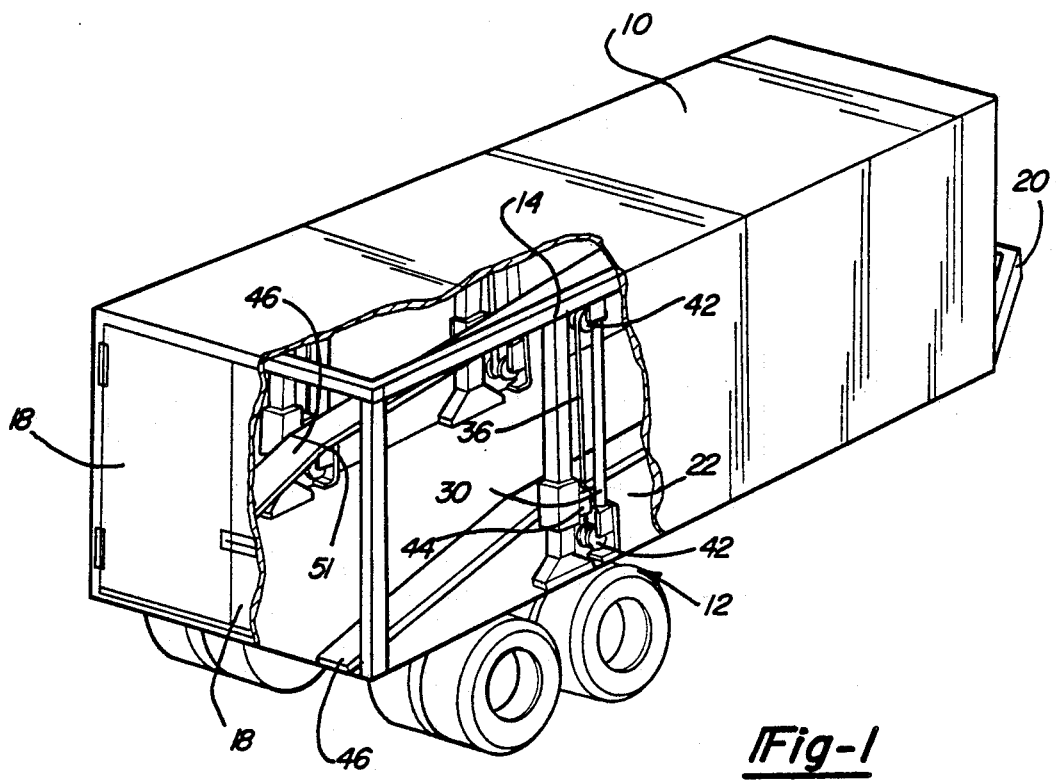
FIG. 1 is a perspective, cut-away view of the invention showing the external surfaces of the enclosure, as well as the position of the vehicle tracks and hydraulic actuators.

With reference now to FIG. 1, an enclosure 10 mounted on a wheeled chassis 12 is depicted. The enclosure 10 may be of any conventional structure, and is typically a metal framework 14 supporting sheet metal. A loading opening is equipped with at least one pivoting door 18 to allow access to the interior of the enclosure. The trailer is equipped with a coupling fixture 20, to allow the trailer to be easily mated and unmated from a motorized tractor unit. The floor 22 of the enclosure 10 is constructed over the rigid framework of the wheeled chassis 12, and equipped with a surface capable of supporting substantial cargo loads. The overall enclosure is thus sufficiently sealed to protect the interior of the enclosure from the elements. In the preferred embodiment, the enclosure 10 is a six-sided box, square or rectangular in cross section. The dimensions of the trailer being sufficient to permit the same to be towed on the highways.

In the preferred embodiment, a series of continuous acting hydraulic actuators 30 are disposed at intervals on each side of the interior of the enclosure 10.

Figure 2:
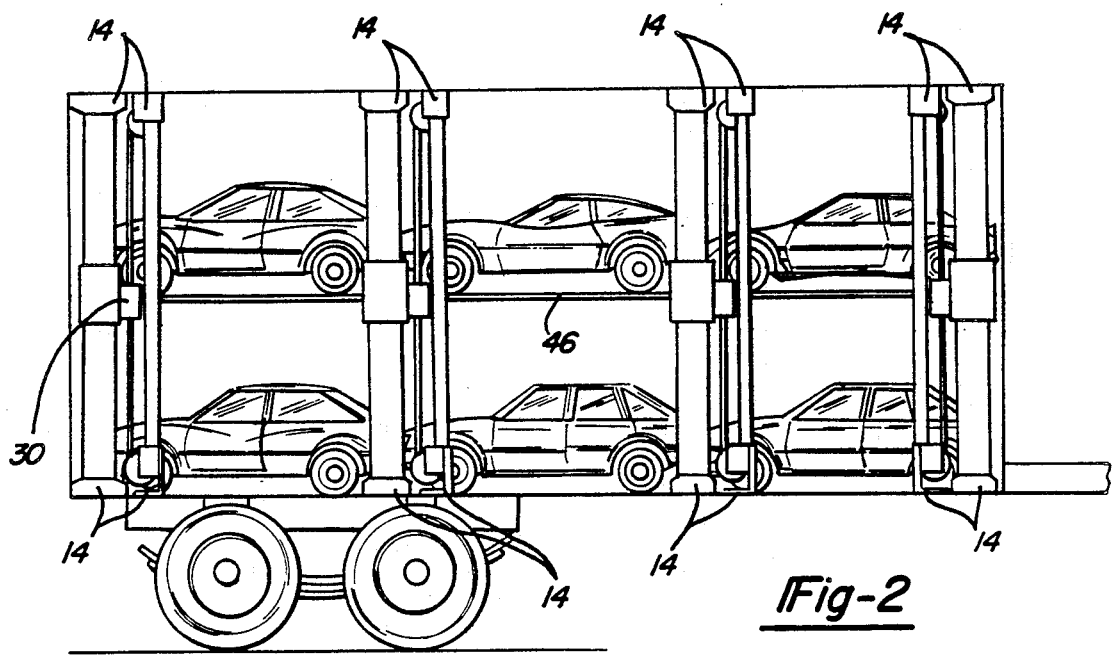
FIG. 2 is a side view of the trailer in the loaded position, carrying vehicular cargo.

FIG. 2 depicts four such actuators 30 on each side of the enclosure 10, at equal intervals. Each actuator 30 is securely affixed at its upper and lower surface to the interior framework 14 of the trailer, and each actuator 20 is disposed at the lateral point most distant from the center line of the trailer to assure that such actuators 30 do not obstruct ingress and egress, as well as loading and unloading cargo.

Figure 3:
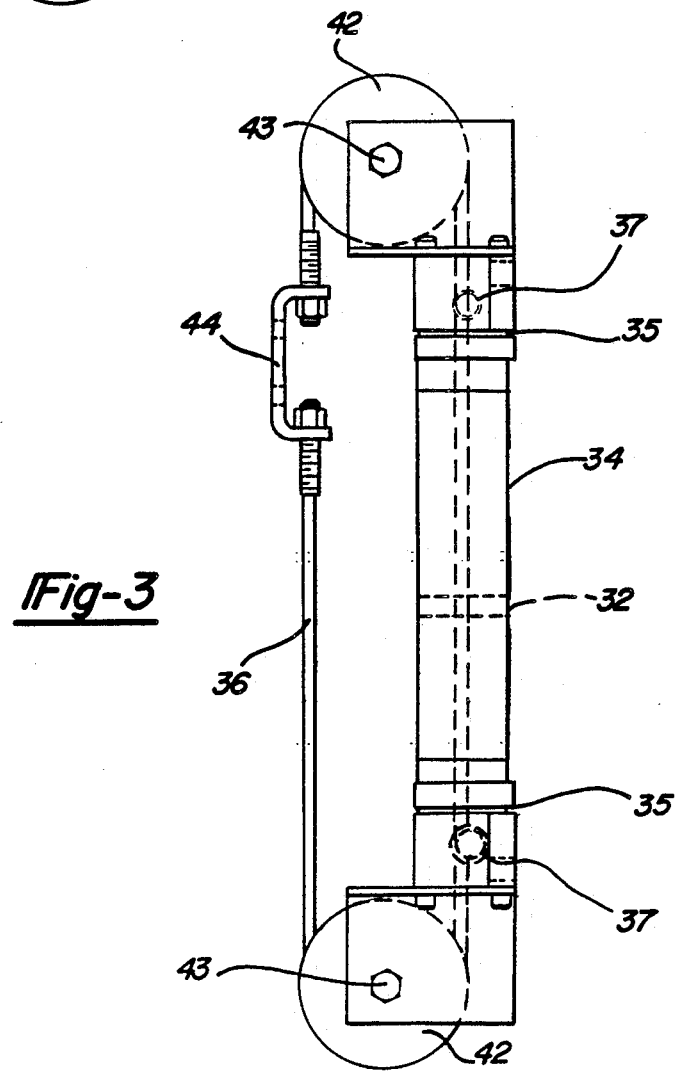
FIG. 3 is a side view of the same trailer, showing the trailer in the loaded position with nonvehicular cargo.

With reference to FIG. 3, the actuators 30 are continuous acting cylinders of a commercially available type, and operate throughout a wide range of travel. Because the continuous acting hydraulic actuator does not require a fixed piston and rod, the piston disk 32 is free to travel from one end of the hydraulic cylinder 34 to the other. The piston is in the form of a disk 32 of sufficient thickness to insure a reliable, non-binding, movable fit between the outer circumference of the disk and the inner walls of the cylinder 34. On opposite sides of the faces of the disk are affixed the ends of a continuous cable 36. The cable is routed through a fluid-type seals 35 disposed at opposing ends of the hydraulic cylinder 34. The hydraulic cylinder 34 itself is provided with a conventional source of hydraulic pressure and hydraulic relief through valves 37 at each of the two opposing ends of the cylinder. The continuous flexible cable 36 is routed, at each end of the cylinder 34, over a pulley wheel 42, the axles 43 of which are affixed in relation to each opposing end of the hydraulic cylinder 34. The flexible cable 36, is at its mid-point between said pulley wheels when the hydraulic actuator disk 32 is at its mid-point in relationship to the end of the cylinders. In addition the flexible cable 36 is equipped with a trolley 44 secured to the cable. In this fashion, as the hydraulic actuating disk 32 within the hydraulic cylinder 34 is moved through its length of travel from one end of each cylinder to the other by virtue of differential hydraulic pressure at the opposing ends of they hydraulic cylinder 34, likewise, the trolley 44 moves in the opposite direction from the disk 32 by virtue of the movement of the cable 36.

Each cylinder 34 is provided with a corresponding conventional and controllable source of hydraulic pressure and hydraulic relief to regulate the movement of the hydraulic actuator and trolley 44.

In the preferred embodiment, as depicted with reference to FIG. 1, articulated rigid tracks 46 are mounted securely through adapters 30 to each series of hydraulic actuators 30 disposed on each side of the interior of the enclosure 10. The track articulation can be accomplished by inherent flexibility of the track, or by a series of hinges 51 disposed at miscellaneous stations over the length of the tracks. This allows individual hydraulic cylinders to modify the positions of the track over its overall length. In a particular loading configuration, for example, it may be desirable to have portions of the tracks somewhat higher or lower in relation to the floor than another portion of the tracks.

In the preferred embodiment, the empty trailer, when used for vehicular cartage, begins in a configuration with the tracks 46 moved in their uppermost position throughout their length. The hydraulic actuators 30 are then adjusted by applying hydraulic pressure and relief, causing the track 46 to move from its retracted position at the roof of the enclosure 10 to a position near the floor of the enclosure 10. Wheeled vehicles will be driven, towed or otherwise installed on the tracks 46. Once the wheeled vehicles have been loaded on the tracks 46, the hydraulic actuators 30 are again pressurized, until the tracks 46 have been raised to a sufficient height above the floor of the vehicle to allow loading on the floor of the vehicle of an additional layer of wheeled vehicles. Optionally, mechanical locks may be placed between the tracks 46 and the track mount guides to secure the tracks 46 mechanically.

The loading of the lower level of the enclosure is then completed, and the trailer may be then considered loaded and ready to be moved. The unloading process is the reverse of the loading process.

Alternatively, the tracks 46 may be stowed in the lowered position, in which case the initial step of lowering the tracks 46 to the bottom position is omitted.

Figure 4:
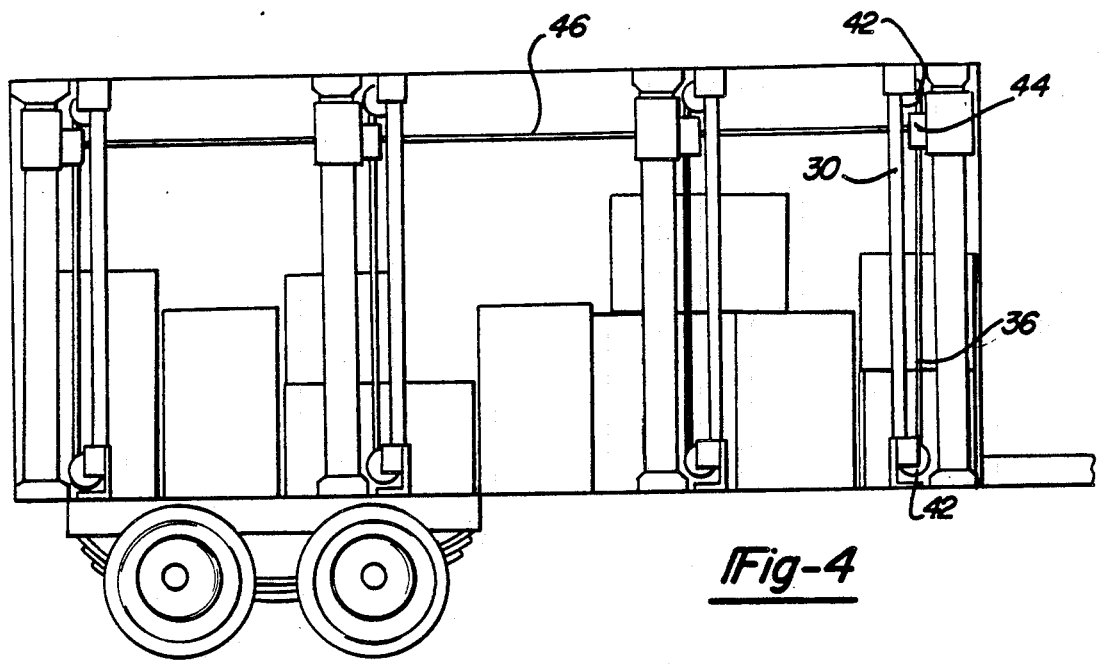
FIG. 4 is a detailed view of the combination of tracks and hydraulic actuators.

Referring now to FIG. 4, the utilization and operation of the trailer for carrying non-vehicular cargo is displayed. In this configuration, the vehicle tracks 46 can be fully retracted to either the uppermost or lowermost position, which is typically within 8 inches of the upper or lower surfaces of the vehicle. Essentially, the entire interior cargo space of the vehicle is then available for use.

Figure 5:
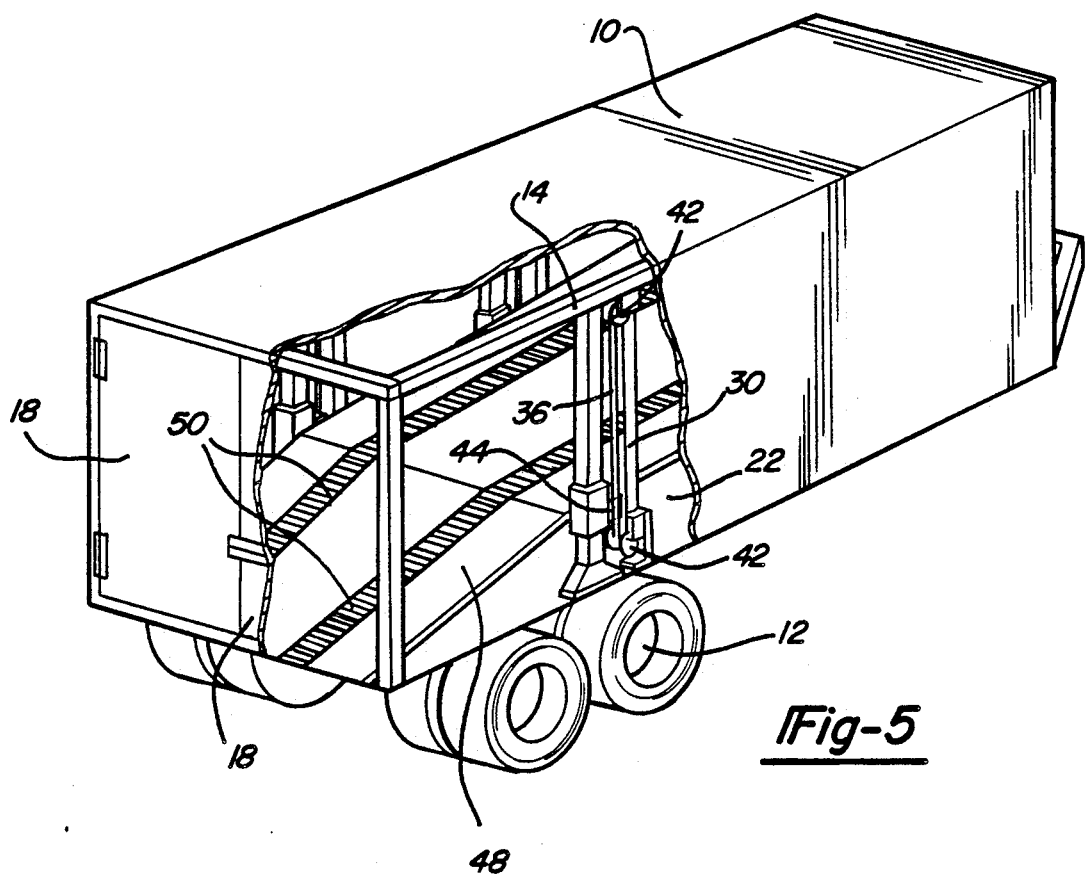
FIG. 5 is a perspective, cut-away view of the invention showing the alternative preferred embodiment utilization of a movable platform.

With reference to FIG. 5, an alternative preferred embodiment is depicted, utilizing a movable platform 48, in place of the tracks 46. This creates an upper level cargo storage area, more adaptable to nonvehicular cargo. Since the platform 48 extends across the majority of the width of the enclosure 10, a second floor has in effect been created.

In addition to the flexible design configurations as previously described utilizing the tracks 46, a segmented design can be utilized to more easily accommodate a wide variety of cargo in a single carrier. The segmented design utilizes a plurality of movable platform 48 sections. Each section of the platform 48 can be raised or lowered independently, providing a greater dimensional variety of cargo areas than a carrier utilizing platforms 48 or tracks 46 which are hinged or otherwise connected. This segmented design is especially useful in transporting cargo of a non-stackable and non-uniform nature.

The movable platform 48, whether in one piece or in sections, is provided with a plurality of slotted openings 50. These openings 50 can be utilized as anchor sites to secure cargo. Chains, ropes or straps can pass through or engage these openings 50, providing a location to anchor vehicles or cargo.

Figure 6:
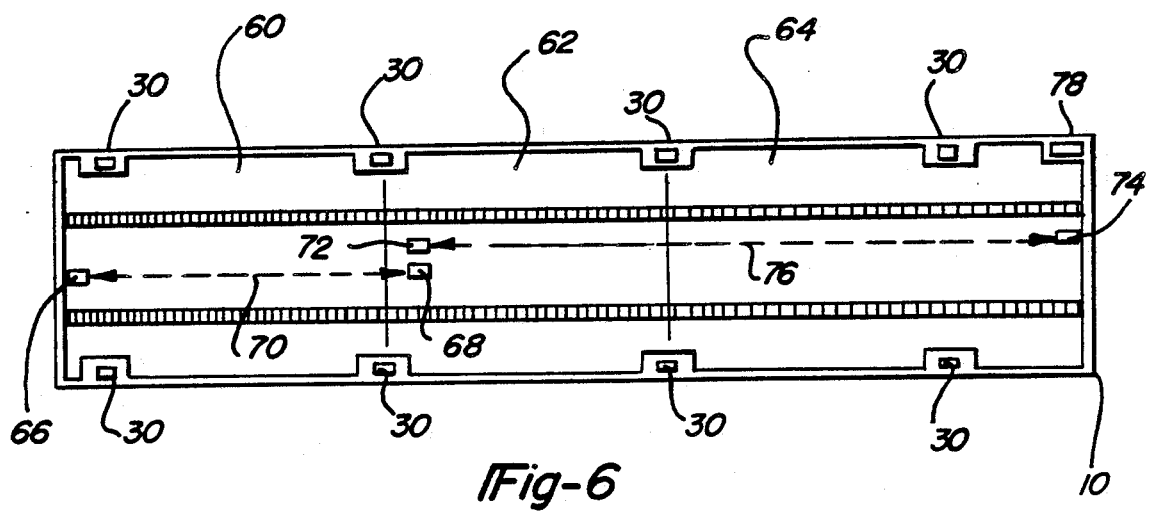
FIG. 6 is an overhead view of the invention depicting the infrared beam hydraulic deactivation system.

Referring now to FIG. 6, a photoelectric sensor utilizing infrared light is used to deactivate the hydraulic actuators 30 when the cargo comes in proximity with the top of the enclosure 10. FIG. 6 also depicts a version of the alternative preferred embodiment which utilizes three platform 48 sections.

In loading the carrier, a first platform section 60, which is located at the front of the cargo area would be loaded first. Upon loading, first platform section 60, would be elevated by suitable control means located at the control panel 78. When cargo comes in proximity with the top of the enclosure, the first beam 70 between the first beam emitter 66 and first beam receiver 68 is broken, which, being wired into the actuators 30 stops the advancement of the actuators 30. The beam emitter 66 and receiver 68 are located on the framework 14, closely oriented to the top of the enclosure 10, as are all other beam units.

As loading continues, the second platform section 62 is loaded and similarly elevated until the second beam 76 between second beam emitter 72 and second beam receiver 74 is broken deactivating the appropriate actuators 30. In this instance, however the path of the second beam 76 covers the second platform section 62, as well as third platform section 64. The second platform section 62 is, therefore, lowered a small amount until the second beam 76 is restored into a functioning uninterrupted beam 76. In this manner, a trailer utilizing a plurality of such platform sections does not need to have a corresponding number of infrared beam, actuator deactivation units. One beam unit can deactivate the advancement of all actuator 30 systems until the beam 76 is restored. Advancement of the actuator is immediately halted upon disruption of the beam 76, therefore only small amounts of lowering will restore the beam. In light of that fact, the method of breaking the beam 76 and then lowering to restore the beam 76 does not adversely affect the dimensions of the cargo storage area underneath the platform 62, or create excessive waste area at the top of the enclosure 10.

In FIG. 6, loading would than continue with third platform section 64, and finally the lower regions could be loaded. Alternatively, one could load the lower cargo areas after each corresponding section was raised.

Having thus described my invention, numerous obvious improvements and modifications to the same may be made without departing from the invention claimed herein which is:

1. An enclosed vehicle for alternately carrying vehicular and non-vehicular cargo comprising:
    (A) a wheeled chassis;
    (B) an enclosure having a length, a width and a height and mounted on said chassis;
    (C) A plurality of full-range, continuously-acting hydraulic actuators each having a fixed length substantially equal to the height of said enclosure and disposed vertically within said enclosure, each having an output component;
    (D) at least one elongated planar support;
    (E) means for affixing the output component of each said actuator to a separate point on said support;
    (F) means for independently operating each said actuator, and
    (G) said elongated planar support being adapted to be moved substantially along the entire height of said enclosure by said hydraulic actuators.

2. The invention of claim 1, wherein said at least one elongated planar support comprises a movable platform of a width slightly less than the width of said enclosure.

3. The invention of claim 2, wherein said movable platform is divided into a plurality of platform sections, each of which is independently operable by said hydraulic actuators.

4. The invention of claim 3, wherein said plurality of platform sections are juxtaposed when retracted to the lowermost position.

5. The invention of claim 3, wherein said plurality of platform sections are capable of being positioned in a tiered arrangement.

6. The invention of claim 2, wherein said movable platform includes at least one tie down site providing an anchor site for securing cargo.

7. The invention of claim 6, wherein said at least one tie down site comprises at least one row of slotted openings.

8. The invention of claim 1, wherein said means for independently operating each said actuator includes a deactivation device mounted inside the enclosure for deactivating the hydraulic actuators when said cargo comes into close proximity with the upper limits of said enclosure.

9. The invention of claim 8, wherein said deactivation device comprises at least one infrared light beam emitter and a corresponding beam receiver whereby an infrared light beam is located in close proximity with the upper limits of said enclosure and causes a deactivation of said hydraulic actuators when the infrared light beam is interrupted.

10. The invention of claim 1 wherein each of said planar supports comprising a moveable platform of a width slightly less than the width of said enclosure, said platform having at least one tie down site comprising at least one row of slotted openings.

11. An enclosed vehicle for alternately carrying vehicular and non-vehicular cargo comprising:
    (A) a wheeled chassis;
    (B) means for removably coupling the front part of said chassis to a towing vehicle;
    (C) a framework defining an enclosure having a length, a width and a height and mounted on said chassis;
    (D) a floor mounted on said chassis;
    (E) a top mounted on said framework;
    (F) a plurality of walls mounted on said framework, said walls forming an enclosure mounted to said framework and said chassis and wherein one said wall is equipped with an opening;
    (G) at least one door within said opening;
    (H) means for opening said door;
    (I) a plurality of full-range hydraulic actuators each having a fixed length substantially equal to the height of said enclosure and disposed vertically at intervals within said enclosure;
    (J) a plurality of mounting trolleys, one said trolley mounted on each said actuator;
    (K) at least one elongated planar support located within said enclosure attached to said trolleys;
    (L) means for actuating said actuators to raise and lower said at least one elongated planar support, said means including a deactivation device comprising at least one infrared light beam emitter and corresponding beam receiver, whereby an infrared light beam is located in close proximity to the upper limits of the enclosure, above said at least one planar support and causes a deactivation of said hydraulic actuators when the infrared light beam is interrupted; and
    (M) said elongated planar support being adapted to be moved substantially along the entire height of said enclosure by said hydraulic actuators.

12. The invention of claim 11, wherein said at least one elongated planar support comprises a pair of tracks of sufficient width to provide support for a wheeled vehicle.

13. The invention of claim 12, wherein said pair of tracks is divided into a plurality of track sections, each of which is independently operable by said hydraulic actuators.

14. The invention of claim 11, wherein said enclosed vehicle further includes a plurality of elongated supports and said deactivation device comprising at least one infrared light beam emitter and corresponding beam receiver, whereby an infrared light beam is located in close proximity to the upper limits of the enclosure, is located above said at least two of said plurality of planar supports and causes a deactivation of said hydraulic actuators associated with said at least two of said plurality of planar supports when the infrared light beam is interrupted.

15. A method for alternatively carrying vehicular and non-vehicular cargo utilizing an enclosed container having a length, a width and a height comprising:
(A) loading cargo onto at least one elongated planar support which is adapted to be moved substantially along the entire height of said container by continuously acting hydraulic actuators;
(B) raising said cargo on said at least one elongated planar support through the use of said continuously-acting hydraulic actuators, each of which has a fixed length substantially equal to the height of said container and each of which is disposed vertically within said enclosed container and attached to said at least one elongated planar support until said actuators are deactivated by said cargo interrupting a light beam oriented above said elongated planar support at the upper limits of said enclosed container whereby preventing damage to said cargo and said enclosed container; and
(C) loading cargo into said enclosed container below said cargo which was raised on said at least one elongated planar support.

16. A method for alternatively carrying vehicular and non-vehicular cargo utilizing an enclosed container having a length, a width and a height comprising:
(A) loading cargo on a plurality of elongated planar supports each of which is adapted to be moved substantially along the entire height of said container by continuously acting hydraulic actuators;
(B) raising said cargo on a first of said plurality of elongated planar supports through the use of said continuously-acting hydraulic actuators each of which has a fixed length substantially equal to the height of said container and each of which is disposed vertically within said enclosed container and attached to said at least one elongated planar support until said actuators are deactivated by said cargo interrupting a light beam oriented above said plurality of elongated planar supports at the upper limits of said enclosed container whereby preventing damage to said cargo and said enclosed container;
(C) lowering said first of said plurality of elongated planar supports until said light beam is not interrupted by said cargo;
(D) raising said cargo on a second of said plurality of elongated planar supports through the use of continuously-acting hydraulic actuators which are disposed within said enclosed container and attached to said at least one elongated planar support until said actuators are deactivated by said cargo interrupting a light beam oriented above said plurality of elongated planar supports at the upper limits of said enclosed container whereby preventing damage to said cargo and said enclosed container; and
(E) loading cargo into said enclosed container below said cargo which was raised on said at least one elongated planar support.

* * * * *